J. J. RICHARDS.

RESERVE PROVIDER FOR FUEL TANKS.

APPLICATION FILED FEB. 12, 1921.

Reissued June 21, 1921. 15,129.

Inventor
John J. Richards;
by Clyde L. Rogers
his atty.

UNITED STATES PATENT OFFICE.

JOHN J. RICHARDS, OF BROOKLINE, MASSACHUSETTS.

RESERVE-PROVIDER FOR FUEL-TANKS.

15,129. Specification of Reissued Letters Patent. Reissued June 21, 1921.

Original No. 1,323,649, dated December 2, 1919, Serial No. 303,361, filed June 11, 1919. Application for reissue filed February 12, 1921. Serial No. 444,569.

*To all whom it may concern:*

Be it known that I, JOHN J. RICHARDS, a citizen of the United States and resident of Brookline, in the county of Norfolk and State of Massachusetts, have invented certain new and useful Improvements in Reserve-Providers for Fuel-Tanks, of which the following is a specification.

This invention relates to liquid fuel tank apparatus such as employed in automobiles and more particularly to means for providing an emergency reserve of gasolene or other liquid fuel that may be made available by the operator after the normal supply in the tank is exhausted. In usual current practice, the gasolene is drawn from the bottom of the tank through a small pipe up through the top of the tank either by a vacuum suction system, or by a pressure system operative in a tank, or by siphon action, and the invention is adapted for any of these systems.

In accordance with my invention I provide a pipe for the delivery of the gasolene, leading downward from the top, toward the bottom of the tank, and equipped for adjustment to either of two positions, in one of which it permits the gasolene to be drawn out down to a certain point in the tank only, while in its other position it permits substantially all of the gasolene to be withdrawn. In the illustrative embodiment herein shown this is embodied as a vertical adjustment of the pipe wherein the pipe may be set normally at a predetermined distance above the bottom of the tank to draw the gasolene therefrom only down to a predetermined point above the tank bottom, leaving a certain definite reserve supply of gasolene which may be drawn upon in emergency by adjusting the pipe farther downward, or so that it is adapted to draw all of the remainder of the liquid fuel from the tank. The foregoing and other objects and advantages of the invention will more fully appear from the following detailed description, and the distinctive features of novelty will thereafter be pointed out in the appended claims.

Referring to the drawings.

Figure 1:
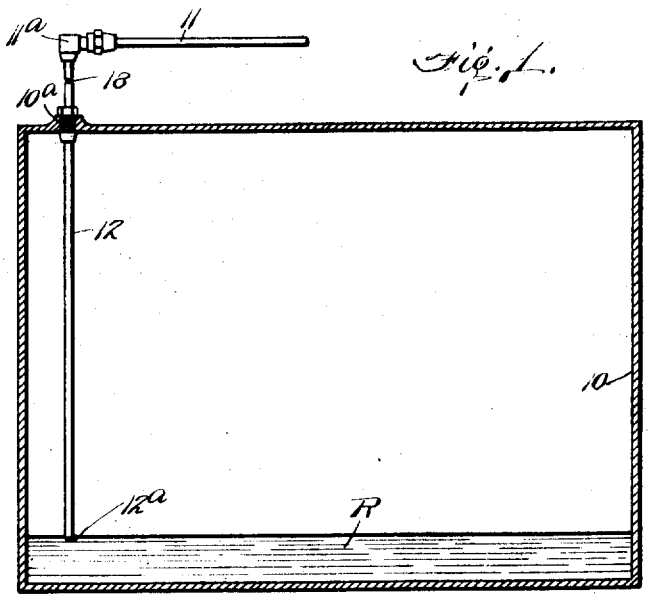
Figure 1 is a vertical sectional view of a fuel supply tank equipped with the device of the invention.
Figure 2:
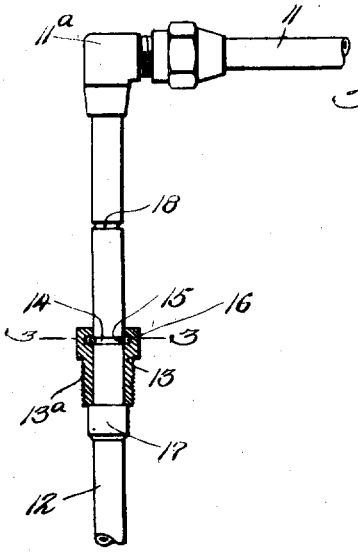
Fig. 2 is an elevation showing the mounting of the gasolene delivery pipe for vertical adjustment, a holding plug for the pipe being shown in section.
Figure 4:
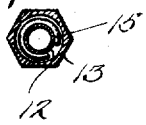
Fig. 4 is a section similar to Fig. 3, but showing the pipe moved out of its locked position.
Figure 3:
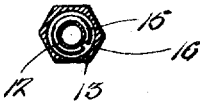
Fig. 3 is a transverse section on line 3—3 of Fig. 2.

10 indicates a gasolene tank which may be of usual type for the delivery of the gasolene in the usual manner. 11 indicates the pipe conduit for delivering the gasolene to the motor. This pipe has an elbow $11^a$ at its end connecting it with a vertical pipe 12 leading down into the tank and slidably fitted through a bushing plug 13 which may be equipped with an externally threaded nipple $13^a$ as usual for securing it in a threaded boss $10^a$ in the top of the tank.

In accordance with my invention, the pipe 12 is fitted for sliding adjustment through the plug 13 and it is equipped toward its upper end with a groove 14 which is engaged by a split spring ring 15 housed in an annular recess 16 in the head of the plug 13. With the ring 15 thus engaged in the groove 14 the pipe 12 is held so that its lower end $12^a$ is a certain predetermined distance above the bottom of the tank, and so as to leave a certain reserve supply R of gasolene in the tank after it is drawn out down to such lower end of the pipe. The pipe 12 may also be equipped with a stop shoulder 17 to limit the upper sliding adjustment thereof, and so that it may not be drawn upward farther than the position shown. When it is desired to utilize the emergency reserve R of the gasolene in the bottom of the tank, the pipe 12 is pressed downward until its lower end is substantially at the tank bottom in which position the ring 15 may engage another groove 18 farther up on the pipe.

Thus the pipe 12 may be held secure against casual displacement, yet with a capability of convenient manual adjustment into either of its two positions as described for leaving an emergency reserve, or for utilizing such reserve at will. It will be understood that the pipe connection 11 from the pipe 12 is, in usual practice, of a fairly flexible nature, so that the described vertical movement of the pipe 12 is permitted without interfering with said connection. I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. The combination with a fuel tank, of a delivery conduit leading from the top thereof to a motor, comprising a portion leading from the lower part of the tank with a member thereof adjustable from the top of the tank constituting in itself the means of adjustment, and arranged in one position of adjustment to leave a predetermined reserve in the tank, and in another position of adjustment to withdraw such reserve for utilization in emergency.

2. The combination with a fuel tank, of a delivery conduit leading from the top thereof to a motor, with an upper portion thereof constituting an operating element and comprising a portion extending downward to near the bottom of the tank including an element equipped to be adjustably set in either of two positions, with an arrangement so that in one position of its adjustment the withdrawal of fuel ceases at a predetermined level above the bottom of the tank, and in another position of adjustment the entire contents of the tank may be withdrawn.

3. The combination with a fuel tank, of a combined fuel delivery and actuating means comprising a pipe connection from the top of the tank to a motor, and extending straight downward from the tank top into the lower part of the tank, said means operable at the top of the tank to cause a draft of fuel from either of two levels, of the body of fuel in said tank.

4. The combination with a fuel tank, of a delivery pipe leading from the top thereof to a motor and with a movable supply connection extending straight downward into the lower part of the tank from the tank top, said supply connection having provision in substantial alinement therewith and operable at the top of the tank to move said connection and thereby cause it to draw fuel from either of two levels of the body of fuel in the tank.

5. The combination with a fuel tank, of a delivery conduit leading therefrom to a motor, comprising a single pipe extending vertically downward through said tank to near the bottom thereof with its lower end continuously open and slidably mounted in the top of said tank with provision for predetermined vertical sliding adjustments therein whereby the lower inlet end of said pipe may be located either at the bottom of said tank or a predetermined distance thereabove at will sufficient to leave a required reserve in the tank, the top of the tank equipped with means for frictionally and yieldingly engaging said pipe to hold it in a given position.

6. The combination with a vertical tank of a delivery conduit leading therefrom comprising a pipe extending from the top of the tank downward with an inlet end near the bottom thereof, the top portion of said pipe having a slidable fitting in the tank top and equipped with spaced apart grooves, said tank top having means for yieldably engaging said grooves to hold the pipe with its lower end a predetermined distance above the bottom of the tank permitting manual sliding adjustment of said pipe so that said inlet will be located approximately at the bottom of the tank at will.

In testimony whereof I have affixed my signature hereto.

JOHN T. RICHARDS.